United States Patent
Deslandes et al.

(10) Patent No.: US 6,669,140 B2
(45) Date of Patent: Dec. 30, 2003

(54) APPARATUS FOR IMPROVING THE INSTALLATION MOMENTS OF EXTERNAL LOADS ON AIRCRAFT

(75) Inventors: Ronald Deslandes, Unterhaching (DE); Stefan Donauer, Geretsried (DE); Alois Pantele, Munich (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/851,414

(22) Filed: May 9, 2001

(65) Prior Publication Data

US 2002/0005459 A1 Jan. 17, 2002

(30) Foreign Application Priority Data

May 9, 2000 (DE) ......................................... 100 22 455

(51) Int. Cl.$^7$ ................................................. B64C 7/00
(52) U.S. Cl. .................................................. 244/118.1
(58) Field of Search ........................... 244/118.1, 118.2, 244/121, 127, 130, 7 B, 13, 204, 3.24, 131

(56) References Cited

U.S. PATENT DOCUMENTS

| | | | | |
|---|---|---|---|---|
| 2,749,064 A | * | 6/1956 | Kuhlman, Jr. ............... | 244/130 |
| 3,380,691 A | * | 4/1968 | McComas ................. | 244/118.1 |
| 3,771,416 A | * | 11/1973 | Ackerman et al. ........ | 244/137.4 |
| 5,476,238 A | | 12/1995 | Parker ....................... | 244/137.4 |
| 6,098,925 A | * | 8/2000 | Burdsall et al. .......... | 244/118.1 |
| 6,105,904 A | * | 8/2000 | Lisy et al. .................. | 244/130 |
| 6,186,445 B1 | * | 2/2001 | Batcho ........................ | 244/130 |
| 6,206,326 B1 | * | 3/2001 | Stanek et al. ............. | 244/118.1 |

\* cited by examiner

*Primary Examiner*—Charles T. Jordan
*Assistant Examiner*—Stephen H Holzen
(74) *Attorney, Agent, or Firm*—Crowell & Moring LLP

(57) ABSTRACT

Apparatus for reducing the installation moments of an external load installed at at least one fastening station of an aircraft includes a ramp arranged in front of the shoulder station relative to the direction of flight. The height of the ramp increases toward the fastening station, and the end of the ramp that is located in proximity of the shoulder station forms a break-off edge that is disposed at a predetermined distance from the outer side of the external load that is directed toward the break-off edge, in order to influence pitch moments and yawing moments of the external load.

9 Claims, 3 Drawing Sheets

APPARATUS FOR IMPROVING THE INSTALLATION MOMENTS OF EXTERNAL LOADS ON AIRCRAFT

BACKGROUND AND SUMMARY OF THE INVENTION

This application claims the priority of German patent document 100 22 455.5, filed May 9, 2000, the disclosure of which is expressly incorporated by reference herein.

The invention relates to an apparatus for improving the installation moments of at least one external load on aircraft.

The single external load is a minimum (there may be more than one), and can consist of any kind of device that is arranged, detachably or not, on the outside of an aircraft; for example, military equipment, such as (a) missile(s). With such external loads, the forces and moments that develop on their fasteners (so-called "installation moments"), must be held to a minimum. If they are low, this will also have a positive effect on the release properties of the external loads.

To date, influencing installation moments by utilizing corresponding load designs has been unsatisfactory, and influencing release properties of the loads using control measures by the aircraft or of the external load has also been unsatisfactory. Moreover, the measures that are known in the art require extensive construction and/or system complexity.

Therefore, it is one object of the invention to achieve, with as little effort as possible, a reduction of the installation moments of aircraft external loads.

Another object of the invention is to achieve an improvement of the release properties for external loads that can be dropped by the aircraft.

These and other objects and advantages are achieved by the apparatus according to the invention, in which a ramp is attached below the fuselage of the aircraft in front (relative to the direction of flight) of the shoulder pylons in order to influence the moments of the external load. A break-off edge of this ramp and its design influence in this context first and foremost the pitch moments of the external load only. The ramp slope also influences the yawing moments, which are influenced by additionally installed stall fences.

Correspondingly, the invention also relates to external loads that are not intended for drop-off as well as to external loads that can be dropped. An external load can be, for example, a working load, a tank, a machine or a missile.

Other objects, advantages and novel features of the present invention will become apparent from the following detailed description of the invention when considered in conjunction with the accompanying drawings.

DETAILED DESCRIPTION OF THE DRAWINGS

Figure 1:
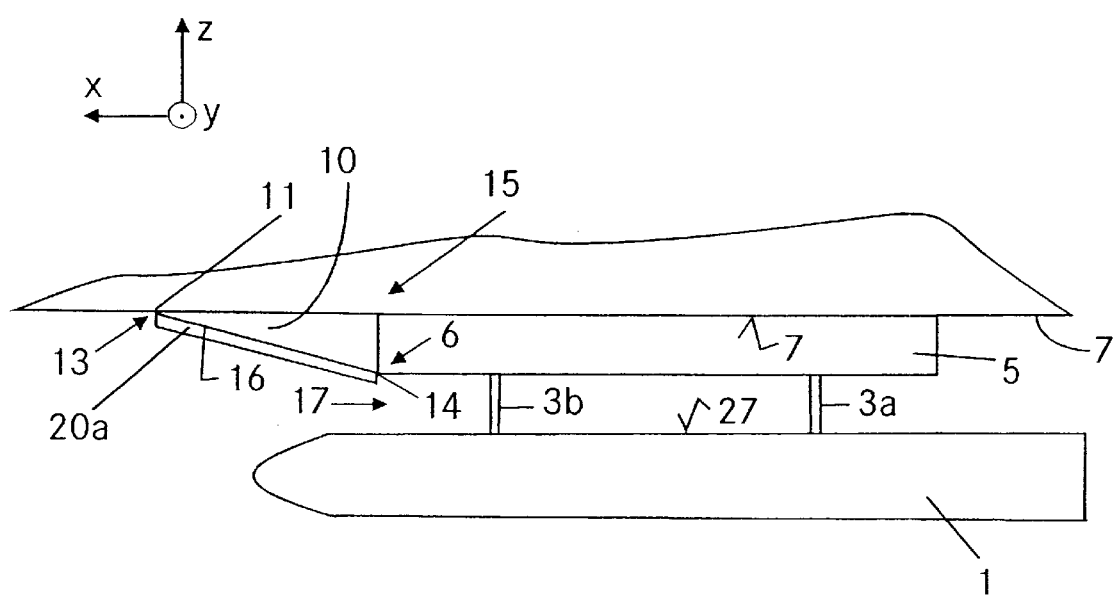
FIG. 1 a schematic side view of a shoulder station for an external load on the bottom part of an aircraft fuselage, including an embodied example of the ramp according to the invention which is equipped with stall fences.
Figure 2:
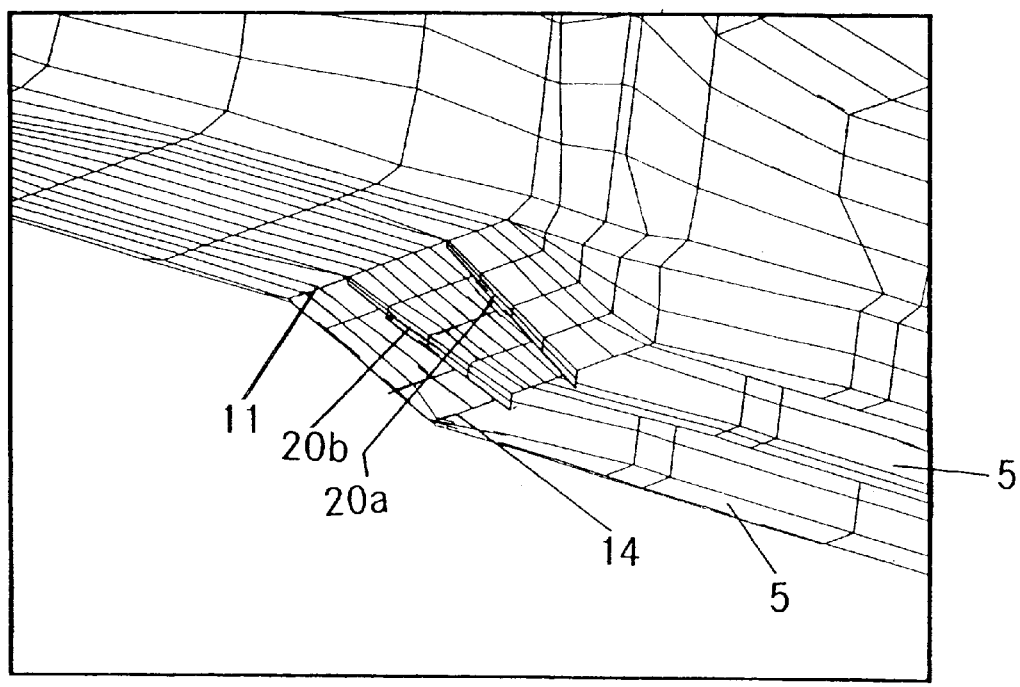
FIG. 2 a perspective view of the bottom of the fuselage, including the ramp with the stall fences.

Aircraft external loads 1 are detachably fastened by way of fastening elements to at least one fastening station 3a, 3b on the bottom side 7 of the aircraft fuselage. The fastening stations 3a, 3b can be arranged on a pylon 5, which may be arranged eccentrically or centrically below the fuselage. A system of coordinates with the axes x, y and z is indicated in FIG. 1; the x-axis runs in the direction of flight whereas the z-axis runs along the vertical axis of the aircraft. According to the invention, it is possible to arrange a single missile (or other external load) or several of each adjacent to each other. The ramp 10 can also be envisioned if the external load is attached to the structure below the fuselage structure without the pylon 5.

According to the invention a compensation ramp 10 (hereinafter referred to as the "ramp") is arranged in front of the pylon 5 on the bottom side 7 of the fuselage. Against the direction of flight x, the ramp starts from a location 11, which has a ramp angle 12 (FIG. 3) arranged in said location, so that from the location 11, where the front edge 13 of the ramp is located as well, the ramp continues with increasing thickness until it reaches the back edge or break-off edge 14 on the end opposite to the ramp angle 12 on the pylon 5. Preferably, for reasons of aerodynamics, the height of the ramp 10 at the break-off edge 14 is essentially identical to the height of the pylon 5. A gap 17 exists between the break-off edge 14 and the outer side of the external load or of the missile 1 that is directed toward the break-off edge 14. In relation to the direction of flight, the ramp 10 is arranged below the front half of the external load 1.

Figure 3:
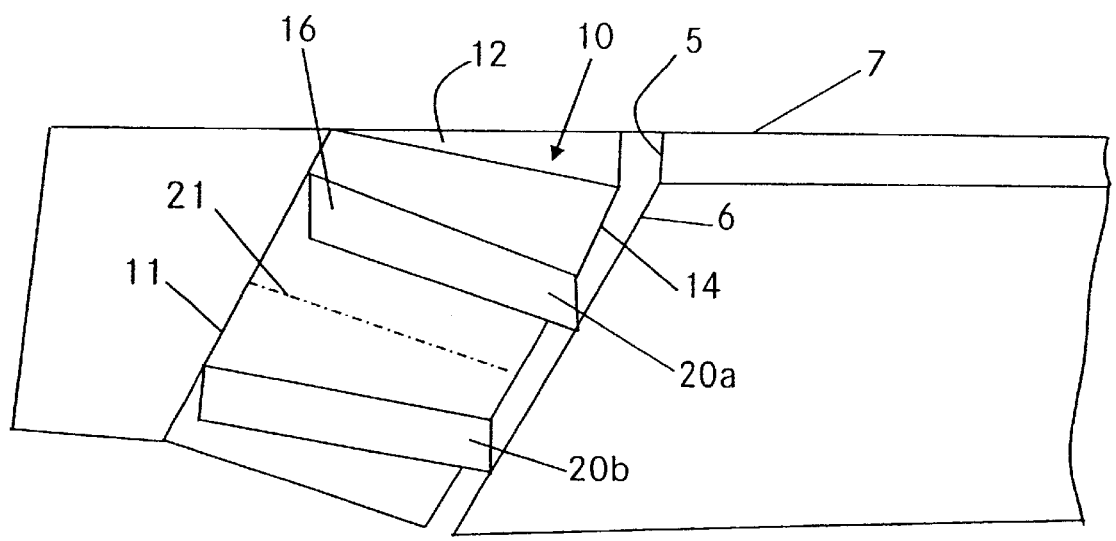
FIG. 3 a perspective view of the embodied example of the ramp including the stall fences according to FIG. 1.

The ramp is realized in one piece. As best seen in FIG. 3, which is viewed upwardly toward the bottom side, the sloped surface that extends from the location 11 to the break-off edge 14, or the external side 16, is preferably realized as a plane; however, in general it can be realized in the y-direction (or laterally to it, i.e., in its longitudinal direction) as curved, or it can consist of different plane sections, or it can be realized as a combination of these. The external side 16, in particular, can also have an S-curve in the x-direction. The ramp 10 and parts of the ramp surface can be realized from one or several partial surfaces which can be at least solid or adjustable.

Two stall fences 20a, 20b (FIG. 3) are optionally arranged on the external side 16 of the ramp 10. They are symmetrical in relation to an axis of symmetry 21, while the distance between the stall fences 20a, 20b in relation to each other decreases from the front edge 13 to the break-off edge 14. Preferably, the stall fences 20a, 20b extend along the entire length of the external side 16 of the ramp 10. Also, they can have the same height from the front edge 13 to the end surface 15, or a decreasing height.

The rearward side 15 of the ramp 10, which is directed downstream, can also be designed as a run-off ramp. The run-off profile serves here to steady and stabilize the angles that develop on the break-off edge 14.

The ramp 10 according to the invention is envisioned for external loads that are carried on pylons 5 below the fuselage; its purpose is to weaken the installation moments that occur at the stations 3b because, in terms of flow physics, the ramp 10 has an impact on the aerodynamics of the installation. In addition, in the event of a drop-off the release properties are improved as well, because large angular movements are prevented that could, for example, cause collisions of the external load with the aircraft contour.

The ramp 10 acts in the following way: The detachment on its break-off edge 14 causes the development of a negative pressure field on the top side 27 of the external load 1 (that is, the side of the external load 1 that faces the bottom side 7 of the fuselage). This causes the pitch-down (nose-down) pitch moment of the external load 1 to be weakened.

The ramp is also able to influence the yawing moment of the external load, especially if the external load is hung at a lateral distance from the longitudinal axis of the aircraft.

In particular, if several missiles or external loads are arranged next to each other, the ramp redirects and accelerates the [air] flow in the middle between the sides of the adjacent external loads that are facing each other. This compensates for the yawing moments; i.e., it reduces them.

By pre-adjusting the slope (i.e., the ramp angle 12), it is possible to change the effect of the ramp. The pitch moment and the yawing moment of a hanging or detaching external load are influenced by the dimension of the ramp angle 12. The gap 17 and the break-off edge 14 are decisive for the pitch moments during the release of the external load 1. The suction flow that develops leeward of the ramp 10 reduces the size of the pitch-down moments of the external load. The height of the gap 17 optimizes the strength of this suction flow.

The stall fences 20 reinforce the latter effects. That is, they strengthen this impact as well as the duration of the yawing moment reduction along the trajectory, by focusing the ramp flow that is deflected below.

By adjusting the geometric dimensions of the ramp 10 it is possible to modify any and all factors that influence these effects, and it is possible to target specifically certain effects. If several external loads are provided adjacent to each other, this will accomplish their detachment free of collisions. obviously, the geometrical dimensions depend on several parameters and mission conditions (e.g., the type of aircraft, the kind of external load or missile, the targeted drop speeds, and the geometry of the pylons 5).

The ramp angle 12 is preferably in a range of between 5 and 45 degrees. According to experience the described effects occur specifically in the range between 15 and 25 degrees. In fighter planes it has been found that a height of the gap 17 which is a range between 50 mm and 250 mm is particularly favorable. The length of the ramp along the x-direction is preferably between 400 mm and 700 mm. Arrangement and design of the external load determines the width of the ramp. The width of the ramp does not exceed the width of the surface of the bottom fuselage.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for reducing installation moments for an external load installed at at least one fastening station of an aircraft, comprising:
   a ramp arranged in front of the at least one fastening station, relative to a direction of flight of the aircraft; wherein,
   a vertical dimension of the ramp increases from a forward edge toward the fastening station;
   a rearward end of the ramp located in proximity to the at least one fastening station forms a discrete break edge which is disposed opposite an outer longitudinal periphery of the external load that faces toward the break edge, and is separated from said break edge by a longitudinally extending gap having a predetermined vertical width, said break edge causing a flow separation in said gap for influencing pitch moments and yawing moments of the external load.

2. The apparatus according to claim 1, comprising:
   at least two stall fences disposed on the sloped external surface of the ramp for further influence yawing moments that act upon the external load;
   wherein the at least two stall fences extend symmetrically in relation to a longitudinal axis of the sloped external surface.

3. The apparatus according to claim 1, wherein dimensions of said break-off edge and of said gap are selected such that suction flow of air through said gap exerts a force on said external load in a vicinity of said at least one fastening station, in an upward direction.

4. Apparatus for influencing in-flight fluid flow forces that act on connection elements for an external load installed at a fastening station on an aircraft, comprising:
   a ramp arranged on a body of the aircraft forward of the mounting station, relative to a direction flight of the aircraft, said ramp having a surface which is inclined from frontward to rearward, relative to said direction of flight, toward the external load and away from the body of the aircraft, whereby a vertical dimension of the ramp increases from frontward to rearward;
   wherein, a rearward extremity of the ramp located proximate to the at least one fastening station forms a discrete break edge which is separated from a longitudinal periphery of said external load by a longitudinally extending gap having a predetermined vertical width, said break edge causing a flow separation in said gap.

5. The apparatus according to claim 4, wherein an inclination angle of said ramp relative to said direction of flight is within a range between 5 to 45 degrees.

6. The apparatus according to claim 4, wherein an inclination angle of said ramp relative to said direction of flight is within a range between 15 to 25 degrees.

7. The apparatus according to claim 4, wherein said gap has a width which is within a range between 50 mm to 250 mm.

8. The apparatus according to claim 4, wherein a length of the ramp is within a range between 400 mm and 700 mm.

9. The apparatus according to claim 4, wherein dimensions of said beak-off edge and of said gap are selected such that suction flow of air through said gap exerts a force on said external load in a vicinity of said at least one fastening station, in an upward direction.

* * * * *